(12) United States Patent
Hur

(10) Patent No.: US 7,083,378 B2
(45) Date of Patent: Aug. 1, 2006

(54) WIND GENERATOR

(76) Inventor: Jae Young Hur, 104-1405 Han Kook A.P.T., #643-2 Bugae-dong, Bupyeong-gu, Incheon 403-721 (KR)

( * ) Notice: Subject to any disclaimer, the term of this patent is extended or adjusted under 35 U.S.C. 154(b) by 0 days.

(21) Appl. No.: 10/503,369

(22) PCT Filed: Oct. 18, 2002

(86) PCT No.: PCT/KR02/01947

§ 371 (c)(1),
(2), (4) Date: Aug. 4, 2004

(87) PCT Pub. No.: WO03/067080

PCT Pub. Date: Aug. 14, 2003

(65) Prior Publication Data

US 2005/0042101 A1 Feb. 24, 2005

(30) Foreign Application Priority Data

Feb. 5, 2002 (KR) ...................... 10-2002-0006512

(51) Int. Cl.
*F03D 3/00* (2006.01)
(52) U.S. Cl. ...................... 415/4.3; 415/17; 415/124.1; 415/908; 416/170 R
(58) Field of Classification Search ................ 415/4.3, 415/4.5, 17, 123, 124.1, 908; 416/170 R, 416/155; 290/44, 55
See application file for complete search history.

(56) References Cited

U.S. PATENT DOCUMENTS

| 2,106,557 | A | * | 1/1938 | Putnam | 290/44 |
| 4,239,977 | A | * | 12/1980 | Strutman | 290/44 |
| 4,366,386 | A | * | 12/1982 | Hanson | 290/44 |
| 4,613,760 | A | * | 9/1986 | Law | 290/44 |
| 5,140,170 | A | * | 8/1992 | Henderson | 290/44 |
| 5,476,293 | A | * | 12/1995 | Yang | 290/54 |
| 6,720,670 | B1 | * | 4/2004 | Makino et al. | 290/55 |
| 6,911,743 | B1 | * | 6/2005 | Ishizaki | 290/55 |

* cited by examiner

*Primary Examiner*—Igor Kershteyn
(74) *Attorney, Agent, or Firm*—Troxell Law Office, PLLC

(57) ABSTRACT

The present invention relates to a wind generator. The wind generator comprises a body installed freely rotatably at a tower, blades installed at a leading end of the body, a gearbox for receiving rotational forces from the blades, and a generator connected to the gearbox for generating electricity. The blades are coupled with a blade angle adjustment unit so that the angles of the blades can be adjusted at predetermined angles according to the directions and velocities of winds. The gearbox comprises a planet gear coupled with a rotational shaft of the blades, a ring gear which has teeth formed on a radially inner surface thereof and engages with the planet gears, and a sun gear which engages with the planet gear and is connected with the generator. Teeth are formed on a radially outer surface of the ring gear so that teeth of a stop gear can be engaged therewith. The wind generator further comprises an electronic brake for controlling the stop gear in such a manner that it stops the rotation of the stop gear and thus causes the ring gear to become stationary.

3 Claims, 7 Drawing Sheets

WIND GENERATOR

TECHNICAL FIELD

The present invention relates to a wind generator using the inertia force of propeller-type blades, and more particularly, to a wind generator in which blades thereof are configured to be rotated even with a general gentle wind so as to increase the rotational inertia force, a direction of the blades is always caused to conform to variable wind directions by means of free rotation of a body of the wind generator so as to increase rotational force, and angles of the blades are adjusted to reduce impact thereon and rotational speed of the blades, and a position of the body is simultaneously changed in a desired direction to prevent damage thereto if a strong wind blows, thereby allowing high efficiency generation of electricity to be always obtained in a stable state.

BACKGROUND ART

Recently, there have been a large number of developments of generators using nuclear power, waterpower, thermal power, tidal power, wind power, solar heat and the like, which are inexhaustible or clean energy sources, in view of exhaustion of underground resources and protection of the natural ecosystem all over the world. There are problems in that installation costs of conventional generators using underground resources as fuels are high, maintenance costs are continuously produced according to the use of the fuels, and wastes are produced due to the use of the nuclear or thermal power, thereby resulting in environmental pollution.

Therefore, there has been a need for use of a wind generator that can solve the problems of conventional propeller-type generators and is economical in view of its installation area and in which installation costs thereof is low and no pollutants are produced. A conventional wind generator generally comprises a body installed freely rotatably at an upper portion of a tower, propeller-type blades installed at a leading end of the body, a gearbox composed of a ring gear, planet gears and a sun gear for increasing rotational force of the blades, and a generator for generating electrical energy using rotational force from the gearbox.

The wind generator using the propeller constructed as such is disclosed in U.S. Pat. No. 4,291,233 and Korean Patent No. 57585.

First, the principle of the general wind generator will be discussed. A rotational speed of the blades of the wind generator is determined to obtain an ideal maximum linear velocity of the blades, which is 80 to 90 m/s, in the atmosphere having pressure of 1 atm. Then, the capacity and rotational speed of the generator are determined, and a gear ratio of the gearbox (ring gear, planet gears and sun gears) is determined. For example, when it is assumed that a rotational speed of a 600 kW generator is 1200 rpm, an outer diameter of the blades is 46 m and a rotational speed of the blades is 35 rpm, the gear ratio i of the gearbox becomes 34.3 (=1,200/35). Although a minimum wind velocity for starting the blades under such conditions is 3 m/s, the blades can be started when power required for rotation of the blades is larger than the load factor, which is resistance of the gearbox, in a state where the gears of the gearbox are engaged with one another.

However, in the conventional wind generators, huge costs and a substantial level of technical know-how are required for designing and manufacturing the wind generators to minimize power loss when the rotational force of the propeller-type blades rotated by wind energy is transmitted to the generator through the gearbox. The most important factor is the gearbox. Since a large resistance is exerted by the load of the weight of the blades and by the respective gears engaged with one another in the gearbox in a state where the rotational force (efficiency) of the gearbox is lowered or the rotation of the blades is stopped due to very gentle winds, the blades cannot be started even though a gentle wind having a minimum wind velocity required for the starting of the blades blows. Thus, the expensive wind generator becomes useless.

Furthermore, since the conventional wind generators are constructed such that the body having the blades rotates about the tower so as to allow the positions of the blades to freely change depending on wind direction, the blades are prevented from stopping due to a change in wind direction so that the force for generating electricity can be obtained. However, there is a problem in that if the wind direction suddenly changes such as by a gust, the rotation of the blades may stop and the blades may also be severely jolted and then broken.

DISCLOSURE OF INVENTION

Accordingly, the present invention is contemplated to solve the above problems in the conventional wind generators. An object of the present invention is to provide a wind generator, wherein a ring gear of a gearbox is controlled to be stopped or rotated so that blades easily rotate even with a gentle wind, and the desired rotational inertia force obtained from the rotation of the blades is caused to be transmitted to the gearbox so that a generator of the wind generator can be rotated, thereby obtaining the maximum operating time thereof.

Another object of the present invention is to provide a wind generator, wherein a vertical tail wing and auxiliary blades are provided at a trailing end of the body so that the blades are always positioned to conform to the wind direction, thereby improving the efficiency of electricity generation.

A further object of the present invention is to provide a wind generator, wherein a body rotation unit having an electronic brake is provided to allow a body of the wind generator to rotate freely or stop by means of its own speed reducer motor, so that if a gust blows, the body rotates in the wind direction and then stops to prevent the blades from being broken, whereas the body freely rotates to cause the blades to conform to the wind direction in normal operating conditions (other than sudden gusts) in order to improve the efficiency of electricity generation.

A still further object of the present invention is to provide a wind generator, wherein the angles of the blades are adjusted depending on changes in wind direction and velocity so as to maintain a predetermined rotational speed and to stably operate a generator, and particularly, the blades are safely protected against strong winds or gusts so as to ensure a prolonged life.

According to the present invention for achieving the aforementioned objects, there is provided a wind generator including a body installed freely rotatably at an upper portion of a tower, blades installed at a leading end of the body, a gearbox for receiving rotational force from the blades and increasing a rotational speed, and a generator connected to the gearbox for generating electricity by means of the increased rotational force received from the gearbox. The blades are coupled with a blade angle adjustment unit so that angles of the blades can be adjusted according to wind direction and velocity. The gearbox includes planet gears coupled with a rotational shaft of the blades, a ring gear which has teeth formed on a radially inner surface thereof and engages with the planet gears, and a sun gear which engages with the planet gears and is connected with the generator. A stop gear is installed to be rotated while being engaged with teeth formed on a radially outer surface of the ring gear. The wind generator further includes an electronic brake connected to the stop gear for fixing or rotating the ring gear by intermittently controlling the rotational motion of the stop gear.

Further, in the wind generator according to the present invention for achieving the objects, an additional gearbox may be installed to increase the rotational force, a body rotation unit for intermittently controlling the rotation of a stop gear rotated while being engaged with teeth formed on a radially inner surface of a tower rotation unit is installed, and a trailing end of the body is provided with a vertical tail wing and auxiliary blades for guiding the blades so that the position of the blades automatically conform to the wind direction.

BEST MODE FOR CARRYING OUT THE INVENTION

Hereinafter, preferred embodiments of the present invention will be described in detail with reference to the accompanying drawings.

Figure 1:
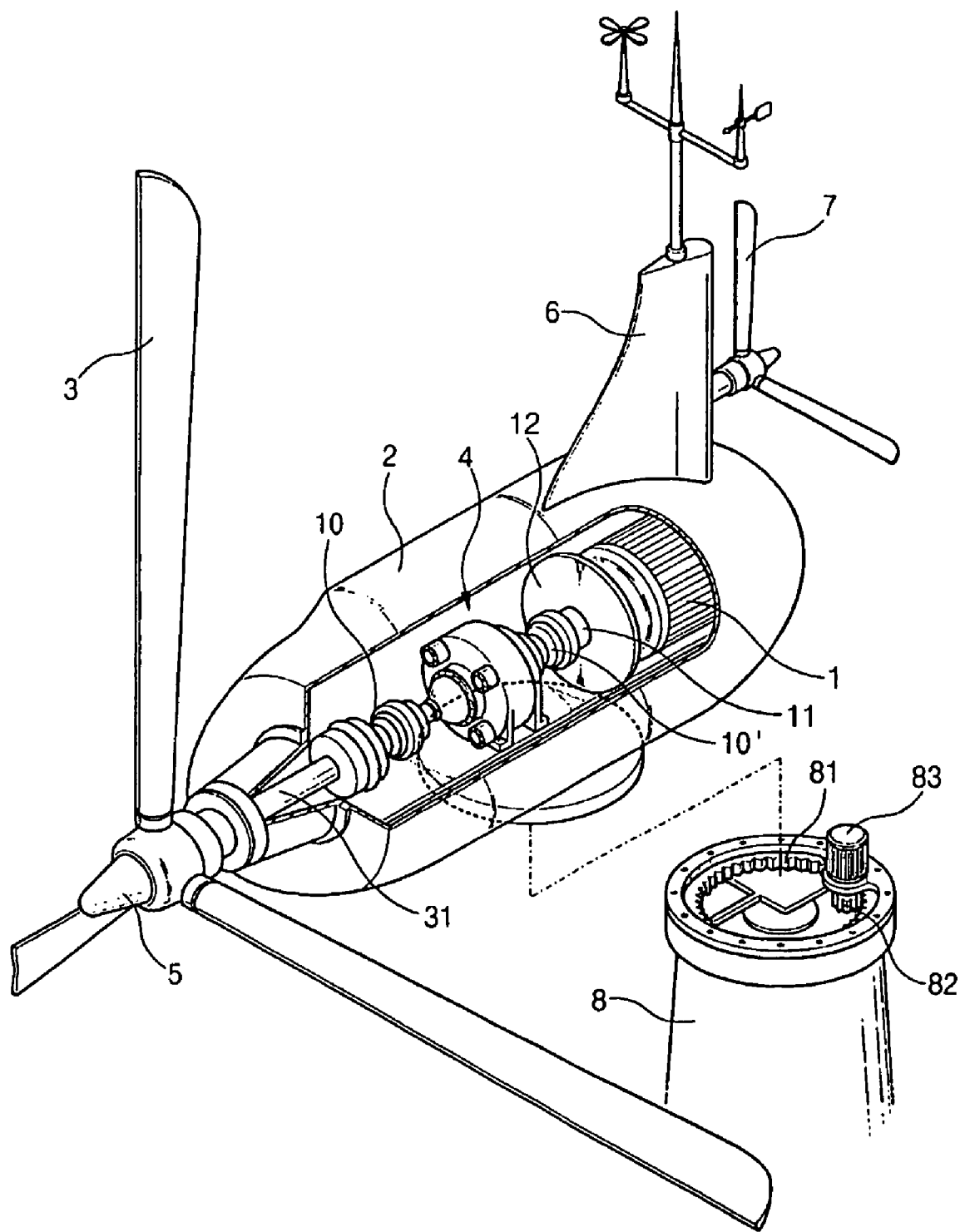
FIG. 1 is an exploded and partially cut-away perspective view showing a wind generator according to the present invention.
Figure 2:
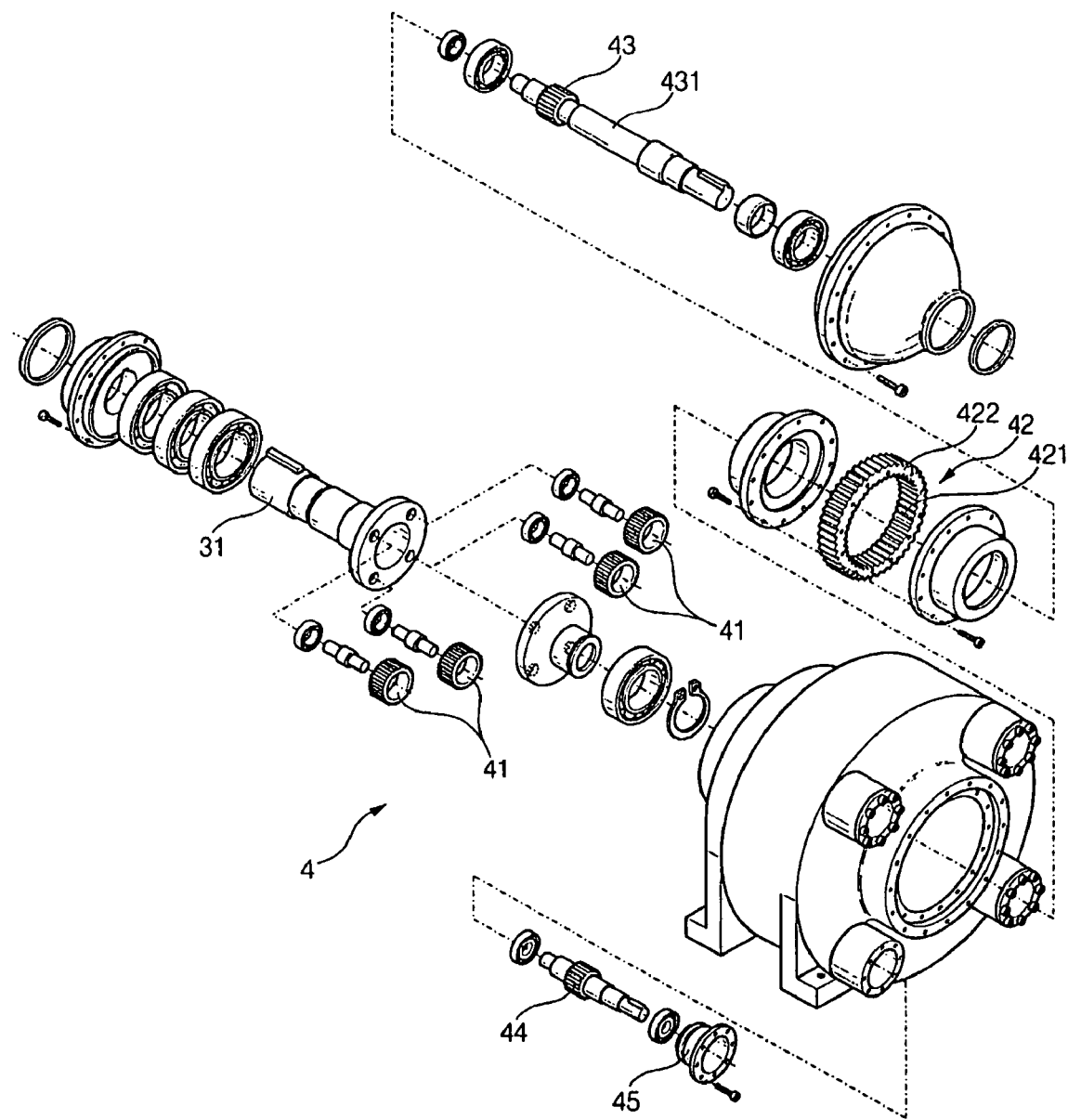
FIG. 2 is an exploded perspective view showing a gearbox of the wind generator according to the present invention.

FIGS. 1 and 2 are a partially cut-away. perspective view showing a wind generator according to one embodiment of the present invention, and an exploded perspective view of a gearbox of the wind generator, respectively. Reference numeral 1 designates a generator, reference numeral 2 designates a body, reference numeral 3 designates propeller-type blades, reference numeral 4 designates the gearbox, reference numeral 5 designates a blade angle adjustment unit, reference numeral 6 designates a vertical tail wing, reference numeral 7 designates propeller-type auxiliary blades, and reference numeral 8 designates a tower.

The body 2 is installed at an upper portion of the tower 8 so as to be rotatable by 360 degrees according to wind direction. The propeller-type blades 3 are installed at a leading end of the body 2. The interior of the body 2 is provided with the gearbox 4, which is connected to and receives rotational force from a rotational shaft 31 of the blades 3, and the generator 1 which is connected to the gearbox 4 and generates electricity.

Since resistance exerted on the blades 3 varies according to changes in wind direction and velocity, a rotational speed of the blades 3 varies accordingly. Further, the generator 1 should be supplied with the rotational force corresponding to a certain rotational speed from the blades 3 in order to generate electricity. However, if the wind direction is proper and the wind velocity is high, the blades 3 are rotated excessively and thus subjected to overload. To solve the problem, the blade angle adjustment unit 5 for adjusting angles of the blades 3 is installed at the leading end of the body 2.

Figure 8:
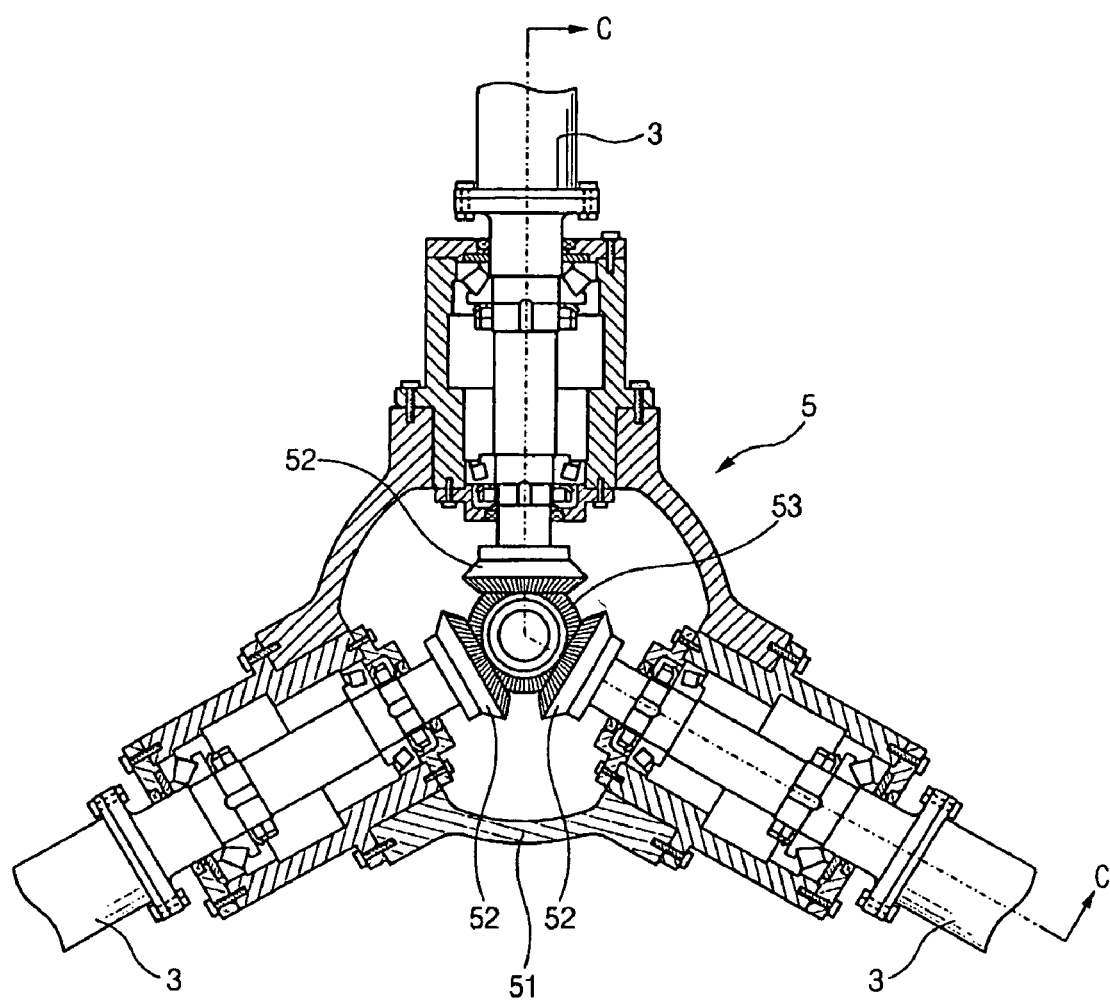
FIG. 8 is a sectional view showing a blade angle adjustment unit of the wind generator according to the present invention.
Figure 9:
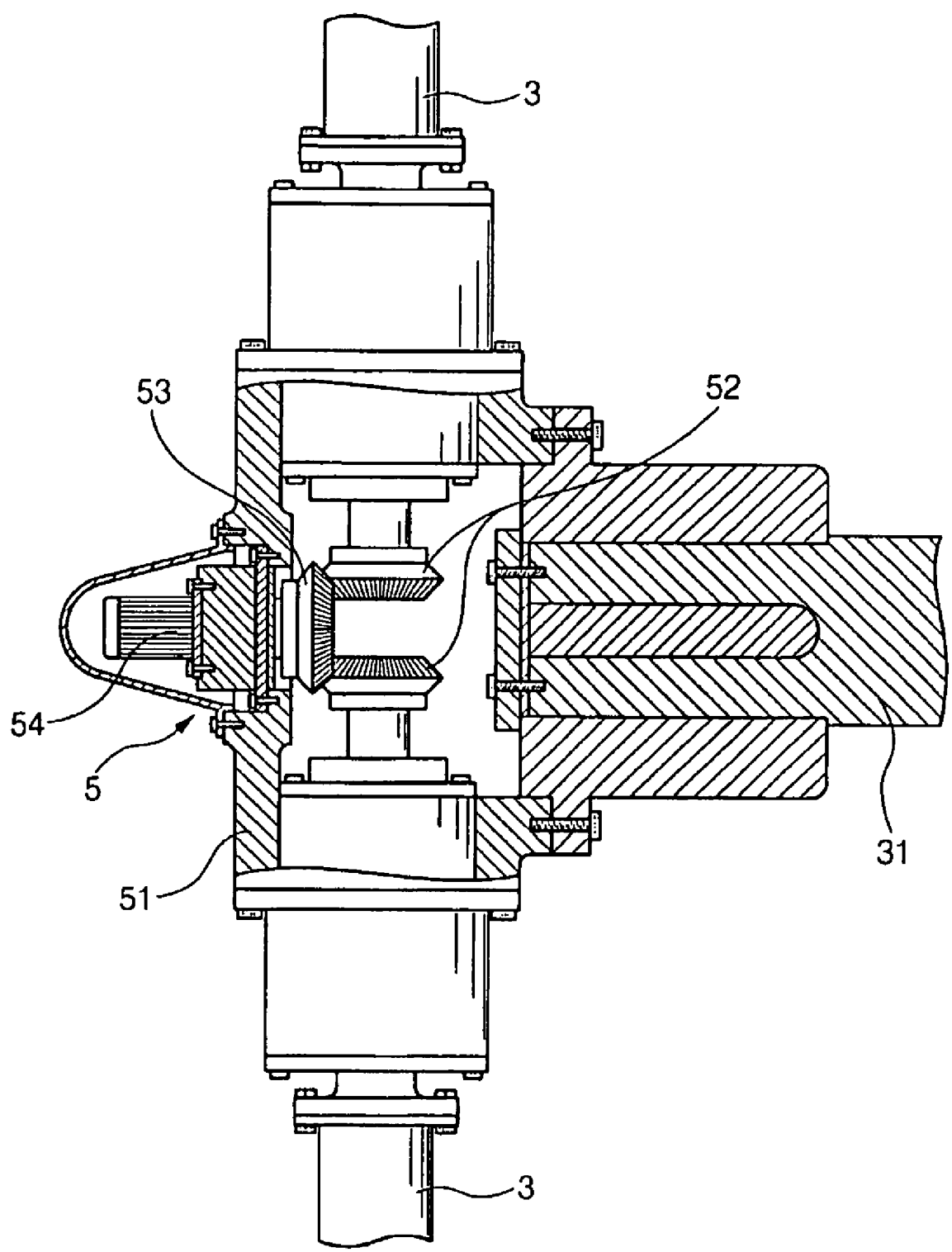
FIG. 9 is a partially cut-away view taken along line C—C of FIG. 8.

In the blade angle adjustment unit 5, as shown in FIGS. 8 and 9, leading ends of the blades 3 are supported by a casing 51 in such a manner that the respective blades 3 are fixed to the leading end of the body 2 and simultaneously rotatably arranged at three positions spaced equiangularly apart from one another by 120 degrees. Bevel gears 52 are fixed to the leading ends of the blades 3. Moreover, a rotational speed reducer 54 having a bevel gear 53 engaged with the bevel gears 52 fixed to the blades 3 is fixed to the casing 51. The casing 51 is fixed to the rotational shaft 31. The casing 51 may be formed to be separable in order to facilitate maintenance and exchange of the leading ends of the blades 3 supported by general bearings as shown in the figures. The rotational speed reducer 54 causes the bevel gear 53 engaged with the bevel gears 52 to be rotated or stopped so that the bevel gears 52 fixed to the blades 3 are kept in a rotating or stationary state. The angles of the blades 3 are adjusted by means of the rotation of the bevel gears 52 and maintained in an adjusted state as the bevel gears 52 are stopped. Electrical signals from the rotational speed reducer 54 are transmitted through general ring connection terminals (not shown) between the casing 51 and the body 2.

Figure 3:
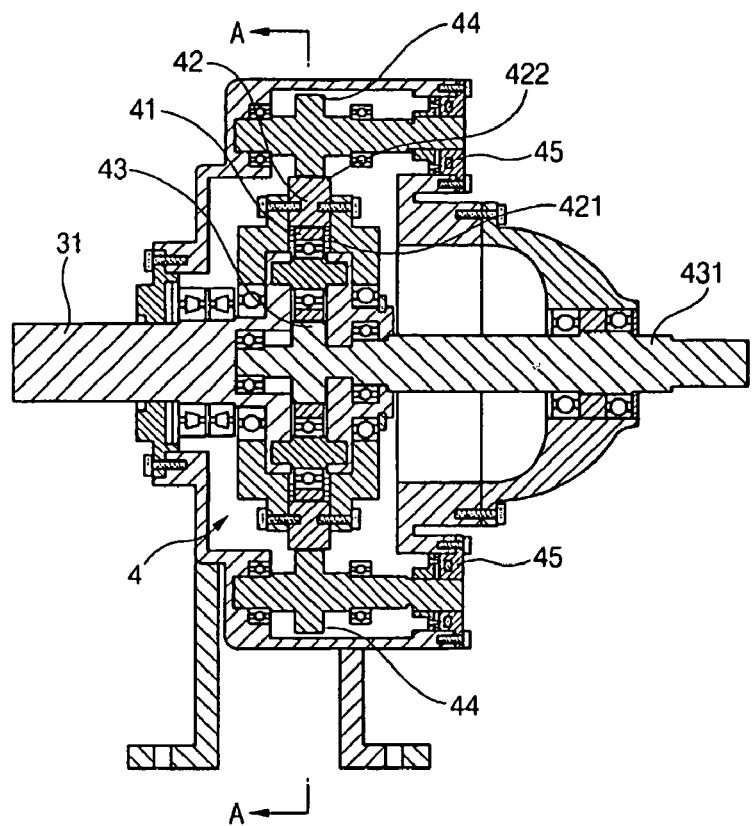
FIG. 3 is a longitudinal sectional view of the assembled gearbox of FIG. 2.
Figure 4:
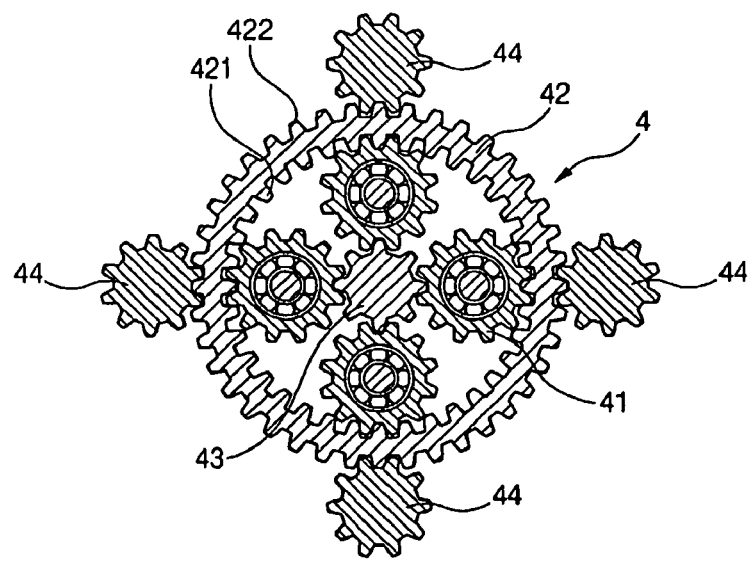
FIG. 4 is a sectional view taken along line A—A of FIG. 3, showing gears in an engaged state.

As shown in FIGS. 3 and 4, the gearbox 4 comprises planet gears 41 coupled with an enlarged flange portion formed at a leading end of the rotational shaft 31 of the blades 3, a ring gear 42 having teeth 421 on a radially inner surface thereof with which the planet gears 41 are engaged to be rotated, and a sun gear 43 which is engaged with the planet gears 41, connected with the generator 1 and placed in the center of the ring gear 42. The planet gears 41 are rotated in a state where they are interposed between the sun gear 43 and the ring gear 42 when the rotational shaft 31 is rotated by the rotation of the blades 3. At this time, if the ring gear 42 is in a stationary state, the sun gear 43 is rotated so that a shaft 431 operates the generator 1. On the contrary, if the ring gear 42 is released from the stationary state, the ring gear 42 is rotated by means of the rotational force of the planet gears 41.

Teeth 422 are formed on a radially outer surface of the ring gear 42 in order to rotate or stop the ring gear 42, and a stop gear 44 is arranged to be engaged with the teeth 422 and thus rotated or stopped.

The stop gear 44 is engaged with the teeth 422 formed on the outer surface of the ring gear 42 and maintains in its stationary state to cause the ring gear 42 to be stopped only when proper wind power capable of rotating the blades 3 is exerted on the blades. Then, as the planet gears 41 are rotated; the sun gear 43 and the generator 1 are operated. Furthermore, when an initial operation is activated or a gentle wind blows, a large rotational force should be exerted on the blades 3 to start the blades 3. Thus, in order to reduce an initial load factor, the stop gear 44 is caused to be rotated so that the rotational force of the blades 3 is not transmitted to the sun gear 43 and the generator 1 through the planet gears 41 and only the ring gear 42 is simultaneously caused to be rotated. Thus, the blades 3 can rotate freely.

The stop gear 44 for stopping or rotating the ring gear 42 is coupled with an electronic brake 45, which is operated by means of on/off intermittence.

The operation control of the electronic brake 45 of the gearbox 4, the blade angle adjustment unit 5 and a body rotation unit 83 is performed by a general electronic control unit (not shown) through input and output of electrical signals.

Meanwhile, although the planet gears 41, the stop gear 44 and the electronic brake 45 have been configured so that four components constitutes a group to maintain balance, it is not limited thereto. It is also possible to arrange them so that two or three components constitute a group.

Preferably, as shown in FIG. 1, in order to provide a constant rotational inertia force to the generator 1 so as to obtain an optimum level of electric power, when the rotational force received from the rotational shaft 31 of the gearbox 4 is caused to be transmitted to a driving shaft 11 of the generator 1 so that the generator 1 is driven, a flywheel 12 which is a weight, is added to one side or both sides of the driving shaft 11. Accordingly, a somewhat irregular rotational motion of the blades 3 according to the amount of wind is converted into a constant inertia motion. Thus, it is possible to generate high quality electric power.

Figure 5:
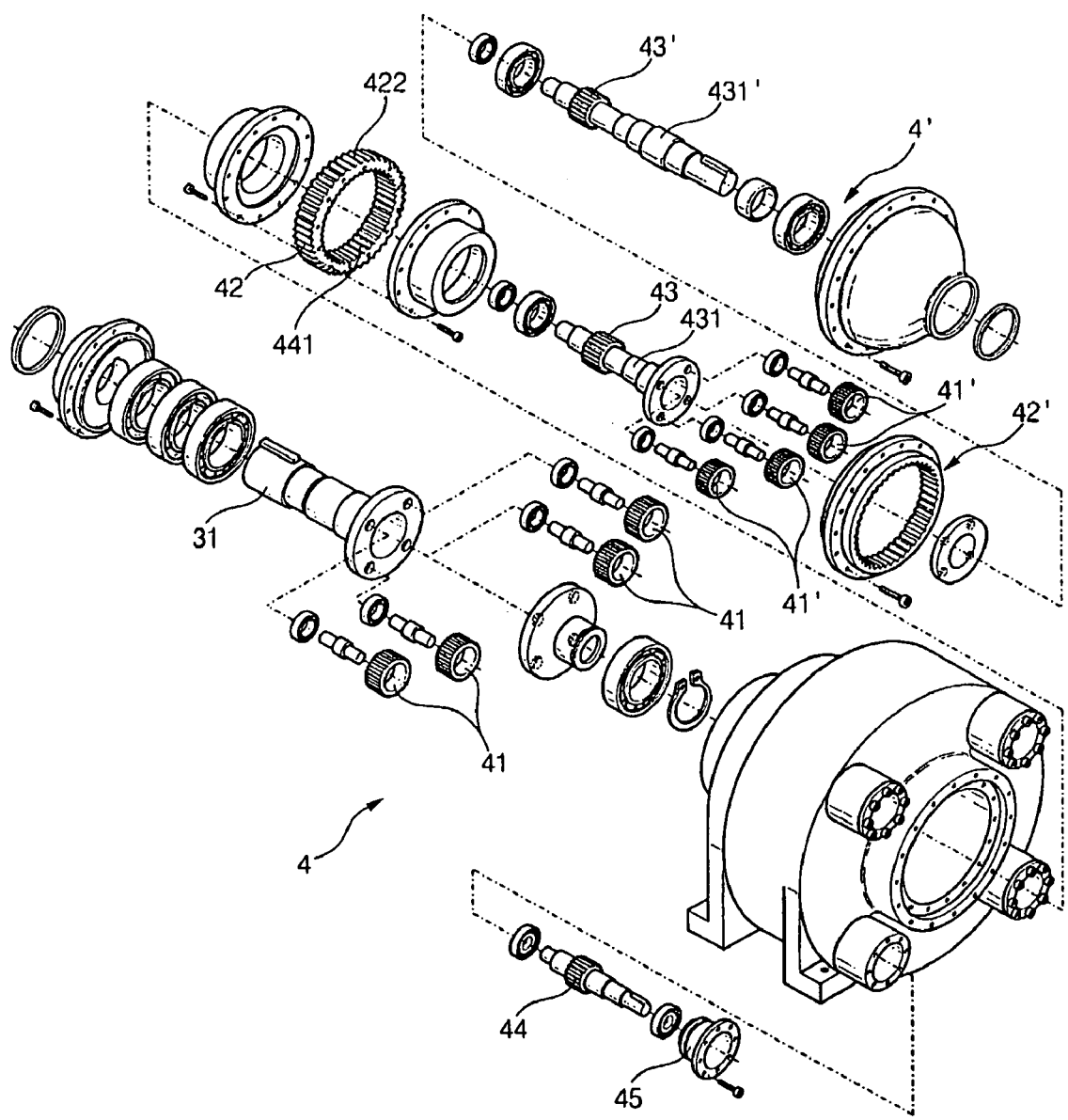
FIG. 5 is an exploded perspective view showing a second gearbox of the wind generator according to the present invention.
Figure 6:
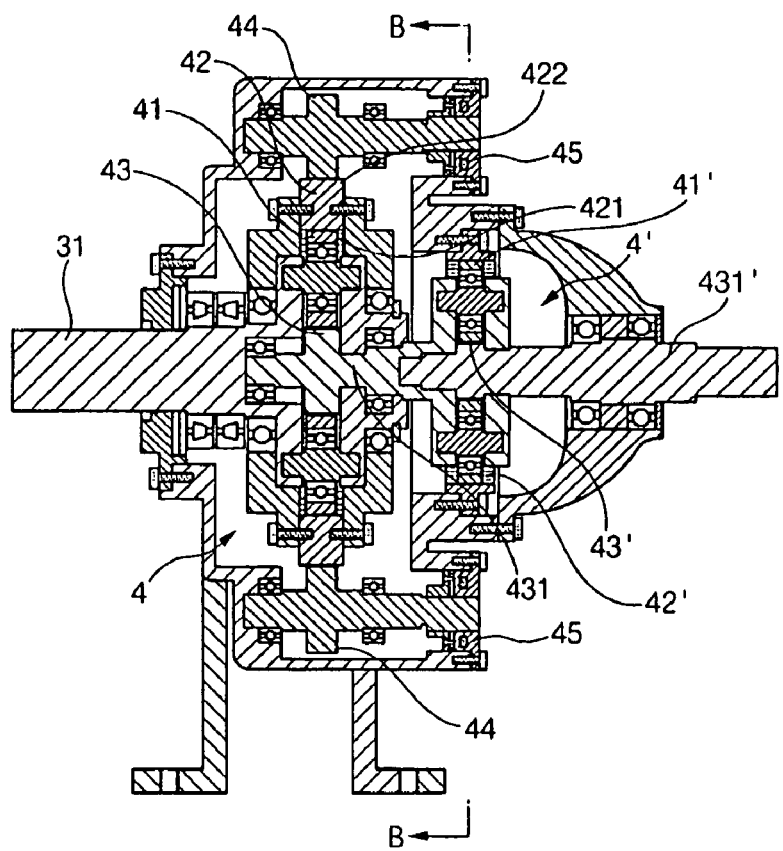
FIG. 6 is a longitudinal sectional view of the assembled gearbox of FIG. 5.
Figure 7:
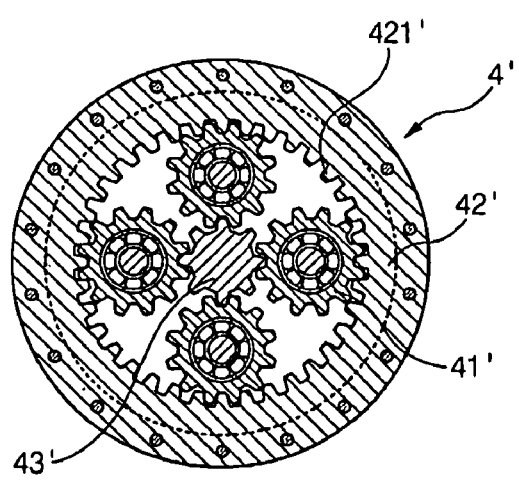
FIG. 7 is a sectional view taken along line B—B of FIG. 6, showing gears in an engaged state.

Another embodiment of the present invention is to increase the rotational force by adding a second gearbox 4' between the gearbox 4 and the generator 1, as shown in FIGS. 5 to 7. The second gearbox 4' comprises planet gears 41' coupled with an enlarged flange portion formed at a leading end of a shaft 431 of the sun gear 43 of the gearbox 4, a ring gear 42' having teeth 421 on a radially inner surface thereof with which the planet gears 41' are engaged to be rotated, and a sun gear 43' which is engaged with the planet gears 41', has a shaft 431' connected with the generator 1 and is placed in the center of the ring gear 42'.

As described above, as a method of connecting the gearbox 4 and the second gearbox 4' with the generator 1, the blades 3 and the planet gears 41 of the gearbox 4 are connected with each other by means of the rotational shaft 31, and the sun gear 43 or 43' of the gearbox 4 or second gearbox 4' and the generator 1 are connected directly with each other by means of the shaft 431 or 431'. Alternatively, for the purpose of convenience of assembly or maintenance, the rotational shaft 31 or the shaft 431 or 431' may be connected by a coupler 10 or 10' in the middle thereof, as shown in FIG. 1.

Further, as shown in FIG. 1, the coupling of the body 2 and the tower 8 in the present invention is made in such a manner that teeth 81 are formed on a radially inner surface of a tower rotation unit so that the body 2 freely rotates by 360 degrees in a state where the body 2 is coupled with the tower 8, and the body rotation unit 83 for intermittently rotating a stop gear 82, which is engaged with the teeth 81 and rotated, is fixed to the body 2. Since the body 2 is rotated through reduction gears disposed within the body rotation unit 83 itself, the position of the body 2 can be changed when it is likely that the blades 3 may be broken due to the occurrence of a gust or the like.

Furthermore, the vertical tail wing 6 for causing the position of the blades 3 to conform to the wind direction is installed in the center of a trailing end of the body 2 of the wind generator according to the present invention. The propeller-type auxiliary blades 7 are installed in the vertical middle of a rear end of the tail wing 6, i.e. the middle position where the wind passing by the blades 3 advantageously contact the auxiliary blades. Thus, the body 2 is not jolted and is kept in a stable position. Further, the auxiliary blades 7 are configured to be rotated in a direction opposite to the rotation direction of the blades 3 subjected to the wind power, so that jolting of the body 2 is prevented and the change in the position of the body can be smoothly made according to the wind direction.

The operating principle of the wind generator according to the present invention will be described below.

As can be understood from FIGS. 1 and 3, if a wind blows, the wind causes the blades 3 to rotate and then passes to the trailing end of the body 2. Thereafter, the wind passes by the vertical tail wing 6 and then causes the auxiliary blades 7 to rotate.

In such a process, the rotational force of the blades 3 rotates the planet gears 41 of the gearbox 4 through the rotational shaft 31, and the planet gears 41 are rotated while being engaged with the teeth 421 formed on the inner surface of the ring gear 42 so as to rotate the sun gear 43. The rotation of the sun gear 43 provides an increased rotational speed larger than that of the blades 3 and operates the generator 1 through the shaft 431 of the sun gear 43. Thus, electricity is generated.

In the meantime, after the blades are stopped as wind power exerted on the rotating blades 3 gradually weakens, restarting the rotation of the blades 3 can be made only when a wind power larger than the total load which is the sum of the weight load of the blades 3, the loads of the rotational shaft 31 and the respective gears of the gearbox 4, and the loads exerted on the generator 1 is produced. Therefore, it is difficult to rotate the blades 3 with a gentle wind. Accordingly, in order to rotate the blades 3 even with a gentle wind, the load factor resulting from the total load should be lowered. To this end, the stationary ring gear 42 should be rotated. When the ring gear 42 becomes rotatable, the ring gear 42 is also rotated together when the planet gears 41, which have received the rotational force from the blades 3, are rotated. At this time, since the transmission of the rotational force to the sun gear 43 and the generator 1 is blocked, the load factor is minimized to enable the blades 3 to be started. The blades 3, which have begun rotating with a gentle wind obtains a gradually increased inertia force resulting from the rotational motion and thus a predetermined rotational force. At this time, the rotation of the ring gear 42 is stopped and the planet gears 41 drive the generator 1 through the sun gear 43.

In particular, if the second gearbox 4' is added as shown in FIGS. 5 and 6, the rotational speed is further increased. Thus, it is possible to obtain an excellent effect in that the efficiency of electricity generation of the generator 1 is more improved. However, the load factor in the initial starting of the blades 3 engaged with the respective gears of the second gearbox 4' is increased, so that it is difficult to initially start the blades 3 with a gentle wind. Accordingly, in order to cause a minimum load factor to be applied to the generator 1, the ring gear 42 is caused to be rotated and then to be stationary when an optimum rotational force is obtained.

As a method of fixing or rotating the ring gear 42, as shown in FIGS. 3 and 4, the stop gear 44 rotated while being engaged with the teeth 422 formed on the outer surface of the ring gear 42 so as to be rotated is coupled with the electronic brake 45 and thus rotated or stopped by means of the on/off intermittence of the electronic brake. Therefore, the ring gear 42 is operated to be stopped or rotated.

Further, in a state where the body 2 is coupled with the tower to freely rotate as shown in FIG. 1, the stop gear 82 rotated while being engaged with the teeth 81 formed on the inner surface of the rotation unit of the tower 8 is also rotated while being engaged with the teeth 81 so that the body 2 freely yaws according to wind direction when optimum wind power is exerted thereon. Then, if a gust blows and thus the body 2 and the blades 3 are subjected to an impact and jolted, the body rotation unit 83 stops the rotation of the stop gear 82 so as to stop the movement of the body 2, thereby preventing the body 2 from being broken.

Moreover, the vertical tail wing 6 installed at the trailing end of the body 2 guides the body 2 so that the position of the blades 3 conforms to the wind direction. That is, the wind is caused to collide directly with wing surfaces of the blades 3 so that a smooth rotational force can be obtained. Further, the auxiliary blades 7 are rotated in the direction opposite to the rotation direction of the blades 3 to prevent jolting of the body 2 and maintain the balance of the body 2 and serve to guide the body 2 to be rotated in the wind direction. In such a way, the auxiliary blades 7 improve the efficiency of electricity generation.

Furthermore, as can be understood from FIGS. 8 and 9, if the wind power exerted on the blades 3 is weak or strong, the rotational speed reducer 54 of the blade angle adjustment unit 5 is operated so that the bevel gear 53 rotates the bevel gears 52 to adjust the angles of the blades 3. Since the angles of the blades 3 are adjusted according to the rotation of the bevel gears 52, optimum angles of the blades 3 can be maintained. Particularly, in a case where a strong wind blows, in order to minimize contact areas of the wing surfaces of the blades 3 with the wind, tilt angles of the blades 3 are adjusted to reduce the impact thereon due to the wind and to simultaneously prevent over-rotation of the blades, thereby ensuring safe use thereof. In order to provide optimum operation conditions, it is also possible to fix the blades 3 after the angles of the blades 3 have been adjusted.

According to the wind generator of the present invention, the load factor applied to the blades is minimized so that the blades can be easily rotated even with a gentle wind. Then, when a desired rotational inertia force is exerted on the blades, the rotational force of the blades rotates the generator through the gearbox so as to obtain a maximum operating time. The efficiency of electricity generation can be further improved by means of the additional gearbox. The vertical tail wing and the auxiliary blades installed at the trailing end of the body cause the position of the blades to always conform to the wind direction so as to improve the efficiency of electricity generation. If a gust blows, the body, which is freely rotating, is stopped and the angles of the blades are adjusted to eliminate resistance to the blades so that the blades are prevented from being broken. The position of the body of the wind generator can be controlled in a desired direction.

The invention claimed is:

1. A wind generator including a body installed freely rotatably at an upper portion of a tower, blades installed at a leading end of the body, a gearbox for receiving rotational force from the blades and increasing a rotational speed, and a generator connected to the gearbox for generating electricity by means of the increased rotational force received from the gearbox, wherein:

the blades are coupled with a blade angle adjustment unit so that angles of the blades can be adjusted according to wind direction and velocity, the gearbox includes planet gears coupled with a rotational shaft of the blades, a ring gear which has teeth formed on a radially inner surface thereof and engages with the planet gears, and a sun gear which engages with the planet gears and is connected with the generator, a stop gear is installed to be rotated while being engaged with teeth formed on a radially outer surface of the ring gear, and the wind generator further includes an electronic brake connected to the stop gear for fixing or rotating the ring gear by intermittently controlling the rotational motion of the stop gear, wherein the blade angle adjustment unit includes a casing which is fixed to the leading end of the body and of which a leading end is supported so that the respective blades can be rotated, bevel gears fixed to leading ends of the blades, and a rotational speed reducer which is fixed to the casing and has a bevel gear engaged with the bevel gears of the blades.

2. A wind generator including a body installed freely rotatably at an upper portion of a tower, blades installed at a leading end of the body, a gearbox for receiving rotational force from the blades and increasing a rotational speed, and a generator connected to the gearbox for generating electricity by means of the increased rotational force received from the gearbox, wherein:

the blades are coupled with a blade angle adjustment unit so that angles of the blades can be adjusted according to wind direction and velocity, the gearbox includes planet gears coupled with a rotational shaft of the blades, a ring gear which has teeth formed on a radially inner surface thereof and engages with the planet gears, and a sun gear which engages with the planet gears and is connected with the generator, a stop gear is installed to be rotated while being engaged with teeth formed on a radially outer surface of the ring gear, and the wind generator further includes an electronic brake connected to the stop gear for fixing or rotating the ring gear by intermittently controlling the rotational motion of the stop gear, wherein a second gearbox including planet gears, a ring gear and a sun gear is additionally installed between the gearbox and the generator so as to increase the rotational force.

3. A wind generator including a body installed freely rotatably at an upper portion of a tower, blades installed at a leading end of the body, a gearbox for receiving rotational force from the blades and increasing a rotational speed, and a generator connected to the gearbox for generating electricity by means of the increased rotational force received from the gearbox, wherein:

the blades are coupled with a blade angle adjustment unit so that angles of the blades can be adjusted according to wind direction and velocity, the gearbox includes planet gears coupled with a rotational shaft of the blades, a ring gear which has teeth formed on a radially inner surface thereof and engages with the planet gears, and a sun gear which engages with the planet gears and is connected with the generator, a stop gear is installed to be rotated while being engaged with teeth formed on a radially outer surface of the ring pear, and the wind generator further includes an electronic brake connected to the stop gear for fixing or rotating the ring gear by intermittently controlling the rotational motion of the stop gear,
wherein teeth are formed on a radially inner surface of a tower rotation unit with which the body is coupled to freely rotate, and the wind generator further includes a body rotation unit for intermittently controlling the rotation of a stop gear rotated while being engaged with the teeth.

* * * * *